United States Patent
Brown

(10) Patent No.: US 11,385,780 B2
(45) Date of Patent: Jul. 12, 2022

(54) FACILITATING INTERACTIVE CONTENT PRESENTATION IN ONLINE COMPUTING ENVIRONMENT

(71) Applicant: CARDLYTICS, INC., Atlanta, GA (US)

(72) Inventor: Derrick Brown, Atlanta, GA (US)

(73) Assignee: Cardlytics, Inc., Atlanta, GA (US)

( * ) Notice: Subject to any disclaimer, the term of this patent is extended or adjusted under 35 U.S.C. 154(b) by 0 days.

(21) Appl. No.: 17/227,244

(22) Filed: Apr. 9, 2021

(65) Prior Publication Data

US 2021/0232280 A1 Jul. 29, 2021

Related U.S. Application Data

(63) Continuation of application No. 16/726,779, filed on Dec. 24, 2019, now Pat. No. 11,010,026.

(51) Int. Cl.
*G06F 3/00* (2006.01)
*G06F 3/0484* (2022.01)
*G06Q 30/06* (2012.01)
*G06F 3/01* (2006.01)

(52) U.S. Cl.
CPC ....... *G06F 3/0484* (2013.01); *G06Q 30/0643* (2013.01)

(58) Field of Classification Search
CPC .. G06F 3/0482; G06F 3/0484; G06F 3/04847; G06F 16/245; G06Q 30/0643; G06Q 40/06; G06T 11/206
See application file for complete search history.

(56) References Cited

U.S. PATENT DOCUMENTS 6,185,587 B1 * 2/2001 Bernardo .............. G06F 40/166
715/234
7,194,678 B1 * 3/2007 Koike ................... G06F 16/972
715/234

(Continued)

OTHER PUBLICATIONS

U.S. Appl. No. 16/726,779, Non-Final Office Action, dated Dec. 10, 2020, 11 pages.

(Continued)

*Primary Examiner* — Nicholas Augustine
(74) *Attorney, Agent, or Firm* — Kilpatrick Townsend & Stockton LLP

(57) ABSTRACT

In some embodiments, a content placement system selects and allocates content objects for a display region in a user interface based on content priorities of the content objects and location priorities of virtual locations in the display region. The content placement system receives a request for content objects to be presented in the display region. The content placement system determines a layout for dividing the display region into multiple virtual locations. Each of the virtual locations contains spots each configured for displaying a content object. The content placement system determines content objects and allocation of the content objects for each of the virtual locations based on content priorities associated with the content objects and location priorities of the virtual locations. The content placement system transmits the content objects according to the allocation to an online platform for display in the user interface.

20 Claims, 6 Drawing Sheets

(56) References Cited

U.S. PATENT DOCUMENTS

| | | | |
|---|---|---|---|
| 7,458,021 B2* | 11/2008 | Balasubramanyan | ........................ G06F 40/186 715/235 |
| 8,799,829 B2* | 8/2014 | Grosz | ................... G06Q 10/101 715/866 |
| 10,337,879 B2* | 7/2019 | Mendels | ............... G01C 21/362 |
| 2003/0233425 A1* | 12/2003 | Lyons | ............... H04L 29/12009 709/217 |
| 2011/0161178 A1* | 6/2011 | Rosenstein | ......... G06Q 30/0277 705/14.69 |
| 2013/0031470 A1 | 1/2013 | Daly, Jr. et al. | |
| 2013/0117151 A1* | 5/2013 | Macaisa | ............. G06Q 30/0633 705/26.8 |
| 2014/0075385 A1* | 3/2014 | Wan | ................... G06Q 30/0601 715/812 |
| 2014/0143252 A1* | 5/2014 | Silverstein | ............ G06F 16/972 707/737 |
| 2015/0120357 A1* | 4/2015 | Tuchman | ....... G06Q 10/063114 705/7.15 |
| 2015/0317750 A1* | 11/2015 | Benhuri | ................ G06F 16/955 705/319 |
| 2017/0116581 A1* | 4/2017 | Shah | ................... G06Q 10/1097 |
| 2018/0173488 A1* | 6/2018 | Zenoff | ................... G06F 1/1647 |
| 2020/0117340 A1* | 4/2020 | Amitay | ................. H04W 4/021 |

OTHER PUBLICATIONS

U.S. Appl. No. 16/726,779 , Notice of Allowance, dated Mar. 9, 2021, 10 pages.
Application No. PCT/US2020/013652 , International Search Report and Written Opinion, dated Sep. 29, 2020, 10 pages.

* cited by examiner

FACILITATING INTERACTIVE CONTENT PRESENTATION IN ONLINE COMPUTING ENVIRONMENT

CROSS-REFERENCE TO RELATED APPLICATION

This application is a continuation application of U.S. patent application Ser. No. 16/726,779, filed Dec. 24, 2019, now U.S. Pat. No. 11/010,026, the contents of which are incorporated herein by reference in their entireties.

TECHNICAL FIELD

This disclosure relates generally to controlling the display of interactive content, and more particularly relates to facilitating the insertion and presentation of interactive content or other content within a user interface of an online interactive computing environment based on the available display region within the user interface.

BACKGROUND

Interactive computing environments, such as web-based applications or other online software platforms, allow users to view various content and perform various computer-implemented functions through graphical interfaces. For instance, an interactive computing environment can present interactive content in the graphical interfaces, such as clickable content for navigating to third-party websites related to various products or services, thereby allowing users to initiate transactions in the computing environment or another computing environment.

SUMMARY

Certain embodiments involve dynamically selecting content and determining the content's arrangement for a display region in a user interface based on, for example, priorities associated with locations in the display region, priorities associated with the selected content, or both. In one example, a content placement system receives a request for content objects to be presented in a user interface. The request specifies a display region in the user interface for displaying the content objects. The display region contains multiple blocks. The content placement system determines a layout that divides the display region into multiple virtual locations. Each virtual location contains several spots. Each spot is configured for displaying a content object. A spot includes one or more blocks. The content placement system selects or otherwise identifies content objects to be placed in the virtual locations. The content placement system does so based on content priorities associated with the content objects. The content placement system further determines an allocation of the content objects to the spots in the virtual locations based on location priorities of the virtual locations. The content placement system transmits a control message to an online platform. The control message includes or identifies the content objects according to the allocation. The control message can instruct or otherwise cause the online platform to present the content objects in the display region of the user interface.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
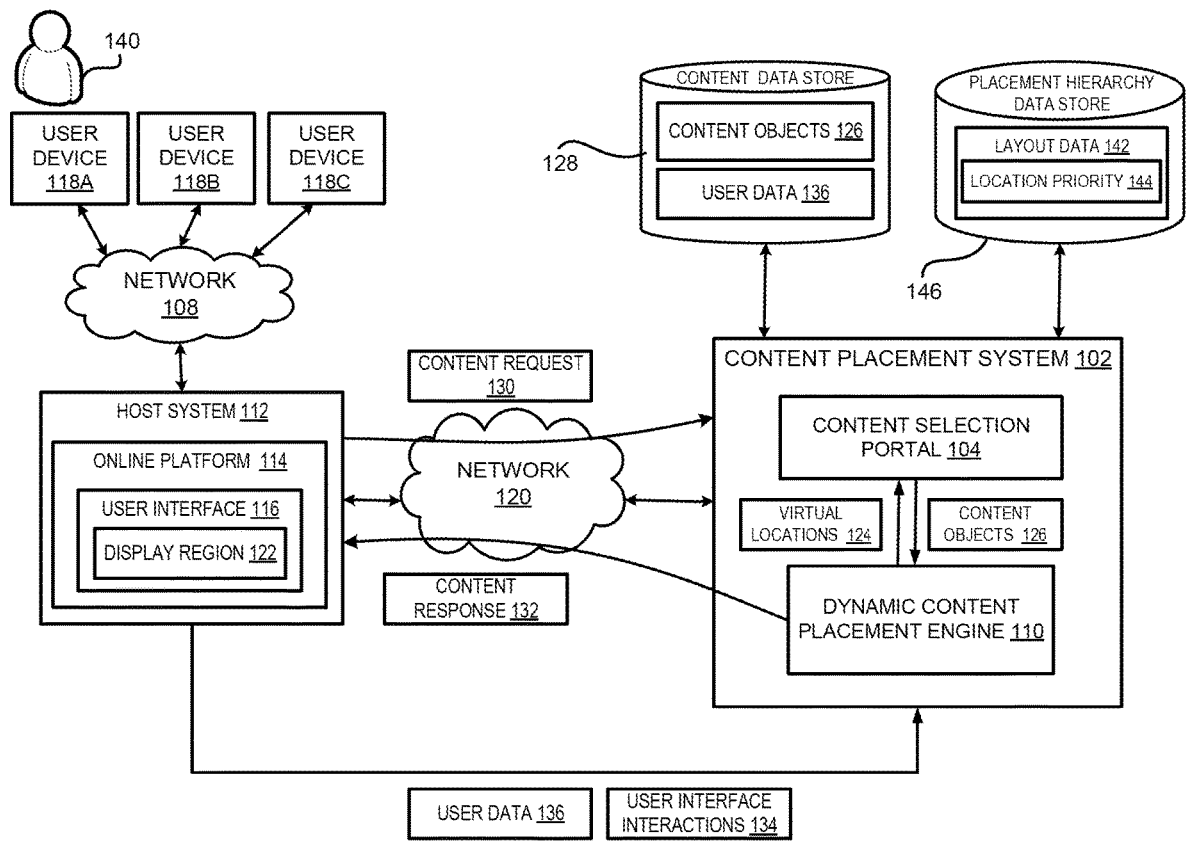
FIG. 1 depicts an example of a computing environment in which dynamic content selection and allocation can be determined for a display region in a user interface provided by an online platform, according to certain embodiments of the present disclosure.

Certain embodiments involve dynamically determining content and content allocation for a display region in a user interface based on priorities of the locations in the region and the priorities of the contents. For instance, a content placement system can receive a request for content for a display region in a user interface to be presented to a user by an online platform. The display region can contain multiple blocks. Responsive to the content request, the content placement system can select a layout to divide the region into multiple virtual locations. Each of the virtual locations contains one or more spots each configured for displaying a content object, such as an image or a video. Each of the spots can include one block or multiple blocks.

The content placement system can select the content objects for each of the virtual locations based on the historical behaviors of the user, such as the past transactions performed by the user. For example, if the user's past transactions involve frequent visits to a website, content objects associated with that website can be selected for one or more of the virtual locations. In addition, the content placement system can determine a content priority for each content object in relation to the user and select the content objects for the virtual locations based on the respective content priorities.

The content placement system further determines a location priority for each virtual location based on past interactions of users with the virtual locations in user interfaces. For example, a particular virtual location can be assigned a higher location priority than another virtual location if the particular virtual location has been activated (e.g., clicked) or viewed by users more frequently than another virtual location or has more post serve spend than another virtual location. Based on the location priorities, the content placement system can sort the virtual locations and process the virtual location based on their location priorities.

In some examples, the content placement system can first process the virtual location having the highest location priority. For this virtual location, the content placement system can determine the available layouts of the spots in the virtual location and the sizes of the content objects selected for this virtual location. Based on these types of information, the content placement system can determine allocation of the content objects to the spots in the virtual location so that the content objects can fit into the virtual location. In cases where there are content objects not assigned to any of the spots of the virtual location, the unassigned content objects are added to the set of content objects for the next virtual location to be processed. The content placement system further assigns placeholder content objects to blocks of the virtual location occupied by a content object larger than a block.

The content placement system can repeat the above process for the remaining virtual locations. In some implementations, the content objects are selected independently for each virtual location. For this reason, some content objects are likely to be selected for more than one virtual location. To ensure no duplicate content objects are presented in the display region, the content placement system can identify and remove duplicate content objects when processing virtual locations. The content placement system can transmit, to an online platform, a content response. The content response can include a control message that identifies the determined allocations of content objects. In some embodiments, the control message can include the content objects. In additional or alternative embodiments, the control message can include control data that allows the online platform to retrieve the content objects (e.g., a manifest that identifies locations of the content objects and identifiers of the content objects). The online platform can present the content objects in the display region of the user interface based on the received content objects and content allocation.

As described herein, certain embodiments provide improvements to interactive computing environments by solving problems that are specific to online platforms. For instance, presenting various content objects in a user interface in a way that allows the user to quickly identify the content of his interest can be challenging because of the large number of online content objects available for selection and the limited space for presentation. Further, due to their online nature, digital contents need to be determined and presented in real-time or near real-time, such as within a couple of seconds.

Certain embodiments presented herein solve these problems by more effectively arranging the presentation of content objects in the user interface so as to increase the visibility of the presented content. The arrangement involves flexible dividing the display region into multiple virtual locations and combining multiple blocks into one spot for presenting a content object. This allows content objects with various sizes to be selected for presentation, which increases the visibility of certain content objects. In addition, content objects are selected based on the content priority for the user to whom they are to be presented, and the arrangement is determined based on the location priority of the virtual locations. As a result, content objects that are more related to the user are presented in spots that are more noticeable to the user. This facilitates the user with viewing the content presented in the online user interface and thus increases the chances that the user will activate a content object. In addition, dividing the presentation region into multiple virtual locations can increase the speed of the process because the content objects for these virtual locations can be determined in parallel, which can allow the real-time or near real-time requirement to be satisfied.

Referring now to the drawings, FIG. 1 is an example of a computing environment 100 in which a content placement system 102 can be employed to select and arrange content objects for display in a display region 122 of a user interface 116. In various embodiments, the computing environment 100 includes the content placement system 102 and a host system 112 hosting an online platform 114 for generating and presenting the user interface 116.

Multiple user devices 118A-118C (which may be referred to herein individually as a user device 118 or collectively as the user devices 118) interact with the online platform 114 through the user interface 116 over a network 108. The user 140 may interact with the user interface 116, for example, through a web browser. In other examples, the user 140 may interact with the user interface 116 through an application installed on the user device 118. The network 108 may be a local-area network ("LAN"), a wide-area network ("WAN"), the Internet, or any other networking topology known in the art that connects the user devices 118 to the host system 112. The interactions can include users hovering the mouse over the content objects in the user interface 116, the users clicking on the content objects, or the users initiating transactions through the content objects in the user interface 116. The transactions may include acquiring a product or a service, visiting other graphical interfaces or posting content, such as texts, images or videos, to graphical interfaces provided by another computing environment.

In some examples, these interactions are performed with respect to content objects presented in a display region 122 of the user interface 116. The display region 122 might be, for example, dedicated to promotional content such as advertisements for different products, services or companies. The content objects in the display region 122 can be activated (e.g., clicked through) to obtain further information about the products, services or companies. The content objects presented in the display region 122 and the placement of these content objects can be determined dynamically for the user 140 who requested the user interface 116.

According to some aspects, the host system 112, responsive to receiving a request for the user interface 116, sends a content request 130 to the content placement system 102 to request content to be presented in the display region 122. The content request 130 can specify the channel-location of the display region 122. The channel-location specifies the channel through which the user interface 116 is to be presented, such as an online website, an email, a mobile application, etc. The channel-location also specifies the location of the user interface 116, such as a reward summary webpage on the online website, or the widget page of a mobile application. The channel-location further specifies the location of the display region 122 within the user interface 116. In some implementations, the channel-location of the display region 122 is represented by a numerical value in the content request 130. Based on the value, the content placement system 102 is able to determine the channel-location of the display region 122.

In some examples, the content placement system 102 is also configured to examine the accuracy of the channel location value. The content placement system 102 can test the user interface 116 containing the display region 122 to determine that the display region 122 is indeed presented in the channel (e.g., the specific webpage of the online website or the specific interface of the mobile application) as indicated by the channel-location value. If the content placement system 102 determines that the channel-location value of the display region 122 is inaccurate, the content placement system 102 can correct the channel-location value before determining the content and content placement for the display region 122.

In some examples, the host system 112 defines the display region 122 as containing an array of rectangular blocks. Digital content selected by the content placement system 102 thus needs to be able to fill in those rectangular blocks. The size of the blocks and the arrangement of the blocks in the display region 122 (e.g., an array of m by n blocks) can be included in the content request 130 or agreed upon beforehand between the host system 112 and the content placement system 102.

Based on the content request 130, the content placement system 102 determines the contents and content placements for the display region 122 by employing a content selection portal 104 and a dynamic content placement engine 110. The content selection portal 104 can select the content for the display region 122. In some examples, the content includes content objects 126, such as images, videos, animated pictures, and the like. One content object can be placed into one or more blocks. The dynamic content placement engine 110 can determine the allocation of the content objects 126 to the blocks of the display region 122.

In some implementations, the dynamic content placement engine 110 determines a layout for the display region 122. The layout can divide the display region 122 into multiple sub-regions so that the content can be determined for the sub-regions separately. The dynamic content placement engine 110 determines the layout based on a placement hierarchy data store 146. The placement hierarchy data store 146 includes layout data 142 that describe various layouts for a display region 122. The content placement system 102 can select a layout from the placement hierarchy data store 146 that matches the display region 122 based on information such as, the size of the display region 122, blocks contained in the display region 122, etc. The sub-regions defined by a layout is referred to herein as "virtual locations" 124.

The dynamic content placement engine 110 can request the content selection portal 104 to select content objects 126 for each of the virtual locations 124. The requests can be sent to the content selection portal 104 in parallel so that the content selection portal 104 can select the content objects 126 independently for each virtual location 124 thereby increasing the speed of the process.

The content selection portal 104 can select and return a set of content objects 126 for each of the virtual locations 124. The content objects 126 for the virtual locations 124 can be selected from a content data store 128 configured for storing available content objects 126. In some examples, the content selection portal 104 selects the content objects 126 for the virtual locations 124 based on user data 136 of the user 140 so that the selected content objects 126 are more accurately match the interest of the user 140. The user data 136 can include, for example, the historical behaviors of the user 140 such as the past transactions performed by the user 140, past actions taken by the user 140, and so on. For example, the user data 136 may include the date and the location where the transactions occurred, the entities involved in the transactions, the amount of money involved in the transactions, and so on. The transactions can include online transactions performed over a data network, such as at an e-commerce website, or offline transactions performed without relying on a data network, such as at a brick and mortar store.

Such user data 136 can be helpful for the content placement system 102 to select the content objects 126 that match the historical behaviors of the user 140. For instance, the content placement system 102 can select a content object 126 associated with entities or companies that the user 140 frequently transacted with. The content placement system 102 can also select a content object 126 associated with a location (geographical location or an online location, such as a website) where the transactions occurred often or the actions were performed often. The content placement system 102 can determine a content priority for each of the content objects 126 based on the user data 136. A content object 126 that is more related to the user's historical behaviors, such as associated with an entity, a location, or other aspects of the frequent transactions, can be assigned a higher content priority than a content object 126 that is less related to the user's historical behaviors. When selecting the content objects 126 for a virtual location 124, a content object 126 having a higher content priority can be selected first. As a result, the selected content objects 126 can match the preference or interest of the user 140 more accurately. When presented with these content objects 126, the user 140 is more likely to interact with the content objects 126, such as clicking through the content objects 126 to initiate new transactions.

In some examples, the user data 136 are collected and transmitted to the content placement system 102 by the host system 112. The online platform 114 might be configured to maintain an account or a profile for the user 140 where records of transactions of the user 140 are recorded. For example, the online platform 114 can be an online platform for a bank and be configured to maintain credit card accounts for customers of the bank. Each of the accounts can include a transaction history of a user's credit card showing the date, location and the amount of the transactions involving the credit card. The transaction history can be used as an indication of the user's interests and preferences for presenting content in the display region 122. The host system 112 can send the transaction histories of the users as the user data 136 to the content placement system 102 so that the content placement system 102 can select content that matches the user's interest or preference.

In some implementations, the host system 112 can send the user data 136 anonymously by removing personal identification information from the user data 136, such as the name, address, social security number, driver's licensing number of the user 140, and the like. Instead, the host system 112 can use a serial number or other identifiers to uniquely identify each user. In this way, the user's historical behaviors can be shared with the content placement system 102 without revealing the true identity of the user 140. The content placement system 102 can store the received user data 136 in the content data store 128 and access the user data 136 when determining content priority for the content objects 126.

The content selection portal 104 can send the selected sets of content objects 126 for the virtual locations 124 to the dynamic content placement engine 110. The dynamic content placement engine 110 can process these virtual locations 124 one by one to determine the placement or allocation of the content objects 126 inside the respective virtual locations 124. In one example, the virtual locations 124 are processed according to the location priority 144 associated with the virtual locations 124. The location priority 144 describes the relative importance of the virtual locations 124 of a display region 122. A virtual location 124 having a higher priority is considered to be more important than a virtual location 124 having a lower priority and is thus processed before the virtual location 124 having the lower priority.

The location priority 144 of a virtual location 124 can be determined based on past interactions of users with the user interface 116. The interactions between the users and the user interface 116 (or more particularly, the display region 122 of the user interface 116) are saved as user interface interaction data 134 by the online platform 114. In some aspects, the user interface interaction data 134 includes activation locations in the display region 122 where the users have interacted with the content objects such as the location that the users hovered the mouse over or that the users clicked on. The user interface interaction data 134 might further include the frequency of the user interaction with different locations in the display region 122. In some examples, the user interface interaction data 134 may also include other data related to the interactions, such as the date and time of the interaction, the users who performed the interactions, and so on. The online platform 114 can share the user interface interaction data 134 with the content placement system 102 so that the user interface interaction data 134 can be utilized for content placement.

The content placement system 102 can analyze the user interface interaction data 134 to determine the relative importance of different locations within the display region 122. For example, the analysis can be performed using blocks as a unit. In this example, the content placement system 102 can determine the number of user interactions for each block in a time period, such as a month, a week, etc. A virtual location 124 whose blocks have the most user interactions can be assigned a higher location priority 144 than other virtual locations 124. The determined location priority 144 can be stored in the placement hierarchy data store 146 along with the layout data 142.

For a given virtual location 124, the dynamic content placement engine 110 determines the placement of the selected set of content objects 126 within the space of the virtual location 124 based on a virtual location layout selected for the virtual location 124. A virtual location layout divides a virtual location into one or more spots each configured for displaying a content object, such as an image or a video. Each of the spots can include one block or multiple blocks. The determination of the placement of content objects in the virtual location can be performed based on information such as the number of spots contained in the virtual location 124, the sizes and locations of the spots, the size of the content objects 126 so that the content objects 126 can best fit into the virtual location 124. In some examples, the layout data 142 further includes content tags for different spots in the virtual locations 124. The content tags specify the types of content objects that can be placed in the respective spot. If a content tag is available for a spot, the content object 126 assigned to the spot should be of a type indicated by the content tag. After the virtual location 124 is processed, the dynamic content placement engine 110 starts to process the next virtual location 124 that has a lower location priority in a similar way. Additional details about selecting and placing content, such as the content objects 126, for a display region 122 of a user interface 116 are described below with respect to FIGS. 2-5.

After the content placement system 102 finishes processing the virtual locations 124 of the display region 122, the content placement system 102 can generate and transmit a content response 132 to the online platform 114. The content response can include a control message that identifies the determined allocations of content objects. In some embodiments, the control message can include the content objects. In additional or alternative embodiments, the control message can include control data that allows the online platform 114 to retrieve the content objects 126 (e.g., a manifest that identifies locations of the content objects and identifiers of the content objects). The online platform 114 can present the content objects 126 in the display region 122 of the user interface 116 based on the received content objects and content allocation.

One or more computing devices are used to implement the content placement system 102 and the host system 112. For instance, the content placement system 102, the host system 112, or both could include a single computing device, a group of servers or other computing devices arranged in a distributed computing architecture, etc.

The online platform 114 can be any suitable online service for interactions with the user devices 118, such as a website or an online service for hosting applications (e.g., mobile apps). Examples of an online platform include an online banking platform, a content creation service, an electronic service for entering into transactions (e.g., searching for and purchasing products for sale, or registering for certain services), a query system, etc. In some embodiments, one or more host systems 112 are third-party systems that operate independently of the content placement system 102 (e.g., being operated by different entities, accessible via different network domains, etc.). In additional or alternative embodiments, one or more host systems 112 include a content placement system 102 as part of a common computing system.

The user device 118 may be any device that is capable of accessing a user interface of an online platform. For non-limiting examples, user device 118 may be a smartphone, smart wearable, laptop computer, desktop computer, or other types of user devices.

Figure 2:
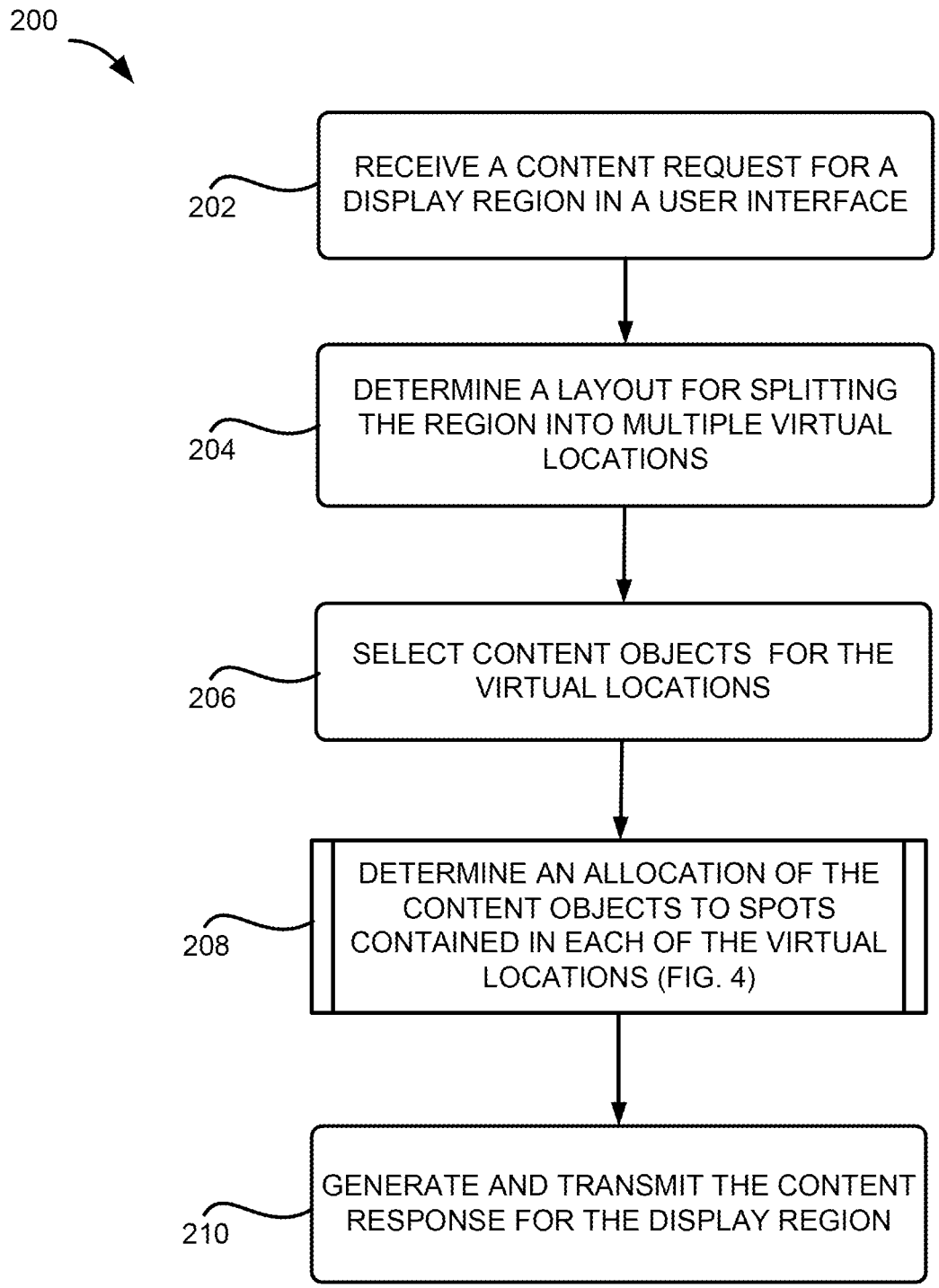
FIG. 2 depicts an example of a process for determining dynamic content selection and allocation for a display region in a user interface provided by an online platform, according to certain embodiments of the present disclosure.

FIG. 2 depicts an example of a process 200 for determining the dynamic content selection and allocation for a display region in a user interface provided by an online platform, according to certain embodiments of the present disclosure. One or more computing devices (e.g., the content placement system 102) implement operations depicted in FIG. 2 by executing suitable program code. For illustrative purposes, the process 200 is described with reference to certain examples depicted in the figures. Other implementations, however, are possible.

At block 202, the process 200 involves receiving a content request 130 specifying a display region 122 in a user interface 116 for which content objects are to be presented. For instance, the content placement system 102 can implement block 202. In some examples, the content request 130 also specifies the user 140 for whom the content is to be presented without including personal identification information of the user 140. The display region 122 includes multiple blocks with equal size and arranged in a block array.

At block 204, the process 200 involves determining a layout for the display region 122. For example, the content placement system 102 can implement block 204 by determining the layout from available layouts stored in the placement hierarchy data store 146 that matches the size of the display region 122. In some examples, the layout divides the display region 122 into multiple virtual locations 124. Each of the virtual locations 124 contains one or more spots each configured for displaying a content object. Each of the spots can include one block or multiple blocks.

Figure 3:
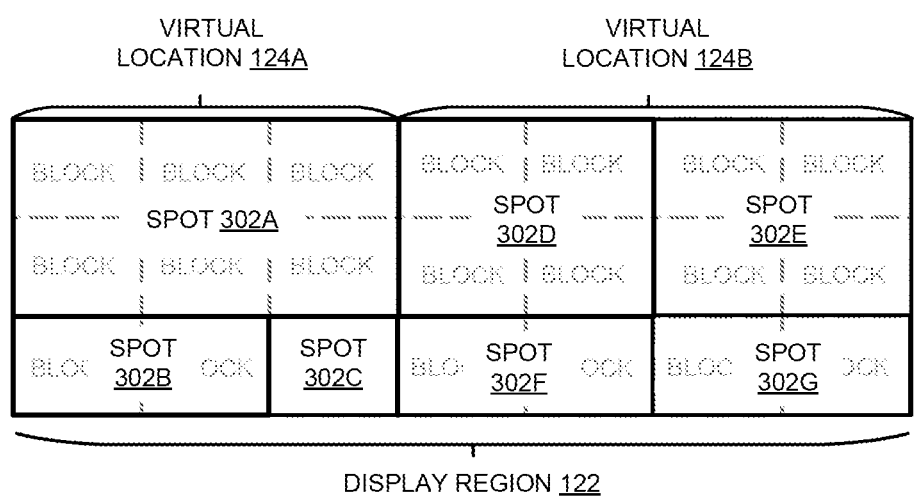
FIG. 3 depicts an example of the relationship between a display region of a user interface, and virtual locations, spots and blocks contained in the display region, according to certain embodiments of the present disclosure.

FIG. 3 depicts an example of a relationship between the display region 122, virtual locations 124, and spots and blocks contained in the display region 122, according to certain embodiments of the present disclosure. In the example shown in FIG. 3, the display region 122 has 21 blocks arranged in a 3×7 block array. The display region 122 is divided into two virtual locations 124A and 124B according to a layout. The virtual location 124A includes three spots 302A-302C. The spot 302A includes 6 blocks and spot 302B includes two blocks and spot 302C includes a single block. The virtual location 124B includes four spots 302D-302G. The spots 302D and 302E each includes four blocks and spots 302F and 302G includes two blocks. Each of the spots in the display region 122 can be used to display one content object. Since the spots have different sizes, the content objects to be presented in these spots can have different sizes. Compared with the existing methods where content objects have the same size and one content object is displayed in one block, the space hierarchy employed herein allow more flexible presentation of content objects in terms of the locations and sizes of the content objects.

Referring back to FIG. 2, at block 206, the process 200 involves selecting content objects for the virtual locations 124. In some examples, the dynamic content placement engine 110 can communicate with the content selection portal 104 to select the content objects. For example, the dynamic content placement engine 110 can send a request for content objects for each of the virtual locations 124 to the content selection portal 104. The content selection portal 104, in turn, returns a set of content objects for each virtual location 124. In some implementations, the content selection portal 104 selects the set of content objects from the content objects 126 stored in the content data store 128 and based on content priority for these content objects 126. As discussed above with respect to FIG. 1, the content priority for a content object 138 can be determined based on the historical behavior of the user 140, such as the past transactions performed by the user 140. The content objects 126 related to the past transactions of the user 140 are assigned a higher content priority than content objects 126 that are unrelated or less related to the past transactions of the user 140. The set of content objects 126 having a higher priority are selected and returned for a virtual location 124.

At block 208, the process 200 involves determining an allocation of the content objects 126 to spots contained in each of the virtual locations 124. For instance, the dynamic content placement engine 110 can implement block 208 to determine the allocation. In some examples, the allocation is determined for the virtual locations 124 one by one. In other words, the set of content objects 126 is allocated or assigned to the spots or blocks in a virtual location 124 before the allocation or assignment is determined for another virtual location 124. The order of processing the virtual locations 124 can be based on the location priorities of the virtual locations 124. Additional details of allocating the sets of content objects 126 to the virtual locations 124 are provided below with respect to FIG. 4.

At block 210, the process 200 involves generating and transmitting the content response 132. The content response can include a control message that identifies the determined allocations of content objects. In some embodiments, the control message can include the content objects. In additional or alternative embodiments, the control message can include control data that allows the online platform 114 to retrieve the content objects 126 (e.g., a manifest that identifies locations of the content objects and identifiers of the content objects). The online platform 114 can present the content objects 126 in the display region 122 of the user interface 116 based on the received content objects and content allocation.

The dynamic content placement engine 110 can implement block 210 by, for example, generating the content response 132 based on the format requested by the online platform 114. For instance, if the online platform 114 requests to receive a content response 132 specifying the content object for each of the blocks contained in the display region 122, the dynamic content placement engine 110 can convert the content objection allocation for spots to content allocation to blocks. This conversion can ensure that each of the blocks in the display region 122 has a corresponding content object. The dynamic content placement engine 110 can generate the content response 132 to include an ordered list of content objects corresponding to an ordered list of blocks contained in the display region 122. In other examples, if the online platform 114 is able to interpret the content object allocation for spots, the spots and the associated content objects can be included in the content response 132. Various other formats can be utilized to transmit the content response 132.

By receiving the content response 132, the online platform 114 can obtain the content objects for the display region 122 and arrange the content objects in the display region 122 according to the content object allocation as specified in the content response 132. For example, if the content response 132 includes an ordered list of content objects for the blocks in the display region 122, the content objects can be placed to the corresponding blocks in the display region 122 based on the order. The completed display region 122 is included in the user interface 116 and presented on the user device 118.

Figure 4:
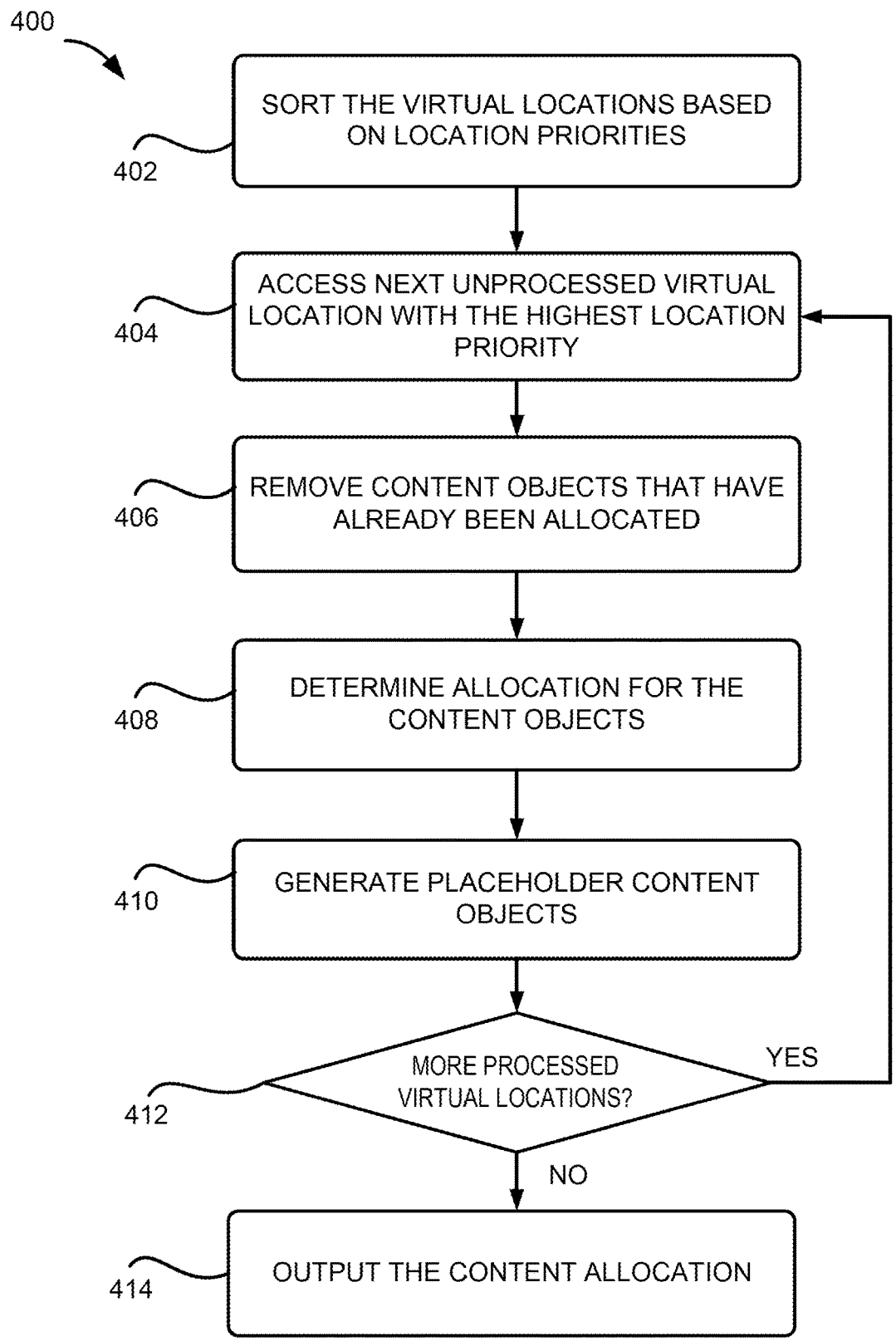
FIG. 4 depicts an example of a process for determining an allocation of content objects to a display region of a user interface, according to certain embodiments of the present disclosure.

FIG. 4 depicts an example of a process 400 for determining an allocation of content objects to a display region of a user interface, according to certain embodiments of the present disclosure. The process 400 can be used to implement block 208 of the process 200. One or more computing devices (e.g., the content placement system 102) implement operations depicted in FIG. 4 by executing suitable program code (e.g., the dynamic content placement engine 110). For illustrative purposes, the process 400 is described with reference to certain examples depicted in the figures. Other implementations, however, are possible.

At block 402, the process 400 involves sorting the virtual locations 124 according to the location priorities of the virtual locations 124. In one example, the dynamic content placement engine 104 can implement block 402 by sorting the virtual locations 124 in a descending order of the location priorities. For instance, the virtual location 124 having the highest location priority is placed first and the virtual location 124 having the lowest location priority is placed last. At block 404, the process 400 involves accessing the next unprocessed virtual location 124 from the ordered list of virtual locations 124. The dynamic content placement engine 104 can implement block 404. Since the list of virtual locations 124 is ordered in the descending order of the location priorities, the next unprocessed virtual location 124 has the highest location priority among the unprocessed virtual locations 124.

At block 406, the process 400 involves examining the set of content objects for the current virtual location 124 and to remove the duplicate content object, i.e., the content object that has been placed for the display region 122. In some embodiments, block 406 can be implemented using the dynamic content placement engine 110. For instance, as discussed above, in some implementations, the sets of content objects 126 are determined by the content selection portal 104 independently for different virtual locations 124. As such, the same content object could be included in more than one set of content objects 126. If the sets of content objects 126 are displayed in the display region 122, one content object might be displayed multiple times in different blocks. This can result in wasting display space, causing confusion to users, or both. As such, the dynamic content placement engine 110 can remove the duplicate content object before determining the allocation of the content objects 126.

If the current virtual location 124 is the first virtual location 124 that is being processed, the dynamic content placement engine 110 records the content objects that are selected for the current virtual location 124. If the current virtual location 124 is not the first virtual location 124 in the ordered list of virtual locations 124, the dynamic content placement engine 110 can determine if there is any unassigned content object from previously processed virtual locations 124. If so, the unassigned content object is added to the set of content objects 126 of the current virtual location 124. The dynamic content placement engine 110 further examines the set of content objects 126 to determine if there is any duplicate content object in the set and if the set of content objects 126 contains any content object that has been previously allocated. If so, the duplicate content object is removed from the set of content objects 126.

At block 408, the process 400 involves determining allocation for the set of content objects 126. For example, the dynamic content placement engine 110 can determine the available virtual location layouts of spots for the current virtual location 124 and the sizes of the content objects for the virtual locations 124. Based on these types of information, the dynamic content placement engine 110 determines a virtual location layout of spots that can fit the content objects to the spots of the virtual location. For instance, if the set of content objects 126 includes a large content object, the dynamic content placement engine 110 can select a virtual location layout including a large spot that matches the size of the large content object. If the set of content objects 126 also includes small content objects, the selected layout should also include small spots for holding the small content objects. In addition, if a content tag is available for a spot, the content object 126 assigned to the spot should be of a type indicated by the content tag.

In some cases, not all the content objects 126 can be allocated to the spots in the selected virtual location layout. The dynamic content placement engine 110 can label those content objects that have not been allocated as unassigned content objects. As discussed above with respect to block 408, the unassigned content objects can be combined with the set of content objects 126 for the next virtual location 124.

At block 410, the process 400 involves generating placeholder content objects. The dynamic content placement engine 110 can implement block 410. Because the content objects 126 selected for the virtual location 124 can include content objects larger than the size of a block, a content object 126 might take the space of multiple blocks (i.e., assigned to a multi-block spot). This large content object can be assigned to the top-left block of the spot occupied by the content object. The remaining blocks in the spot can each be assigned a placeholder content object. During the rendering of the user interface 116 at the online platform 114, the placeholder content objects are not rendered. As a result, only the large content object assigned to the top-left block is displayed taking space of all the blocks in the spot. In scenarios where the content objects 126 for the virtual locations 124 are all assigned to a single-block spot, the dynamic content placement engine 110 does not need to generate the placeholder content objects.

Figure 5:
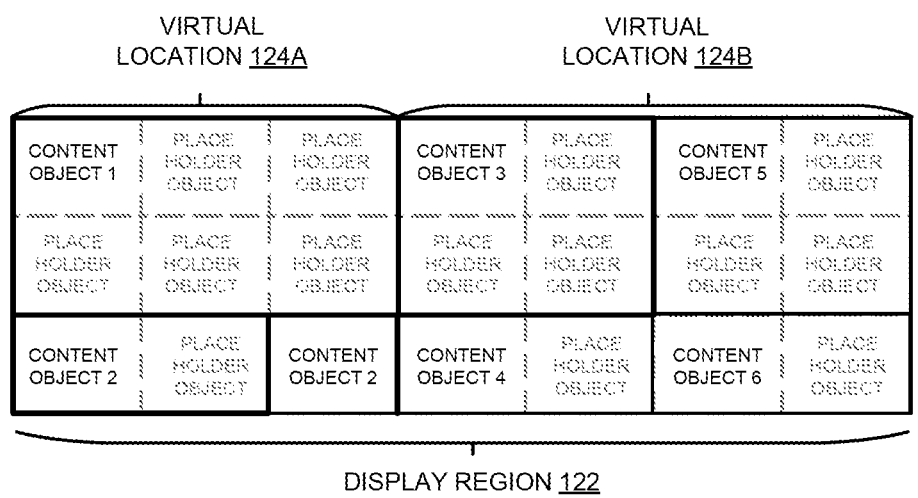
FIG. 5 depicts an example of the content object allocation including the placeholder content objects for the example display region shown in FIG. 3, according to certain embodiments of the present disclosure.

At block 412, the process 400 involves determining if there is any unprocessed virtual locations 124. The dynamic content placement engine 110 can implement block 412. If there are unprocessed virtual locations 124, the process 400 involves, at block 404, accessing the next unprocessed virtual location 124 in the ordered list and repeat the above process. If all the virtual locations 124 have been processed, the process 400 involves outputting the content allocation for the display region 122 at block 414. The dynamic content placement engine 110 can implement block 414. FIG. 5 shows the content object allocation including the placeholder content objects for the example display region 122 shown in FIG. 3. In this example, six content objects are allocated to the display region 122. For content objects larger than a block, the content object is assigned to the top-left block in the spot and placeholder content objects are assigned to other blocks of the spot so that every block has an assigned content object.

Example of a Computing System for Implementing Certain Embodiments

Figure 6:
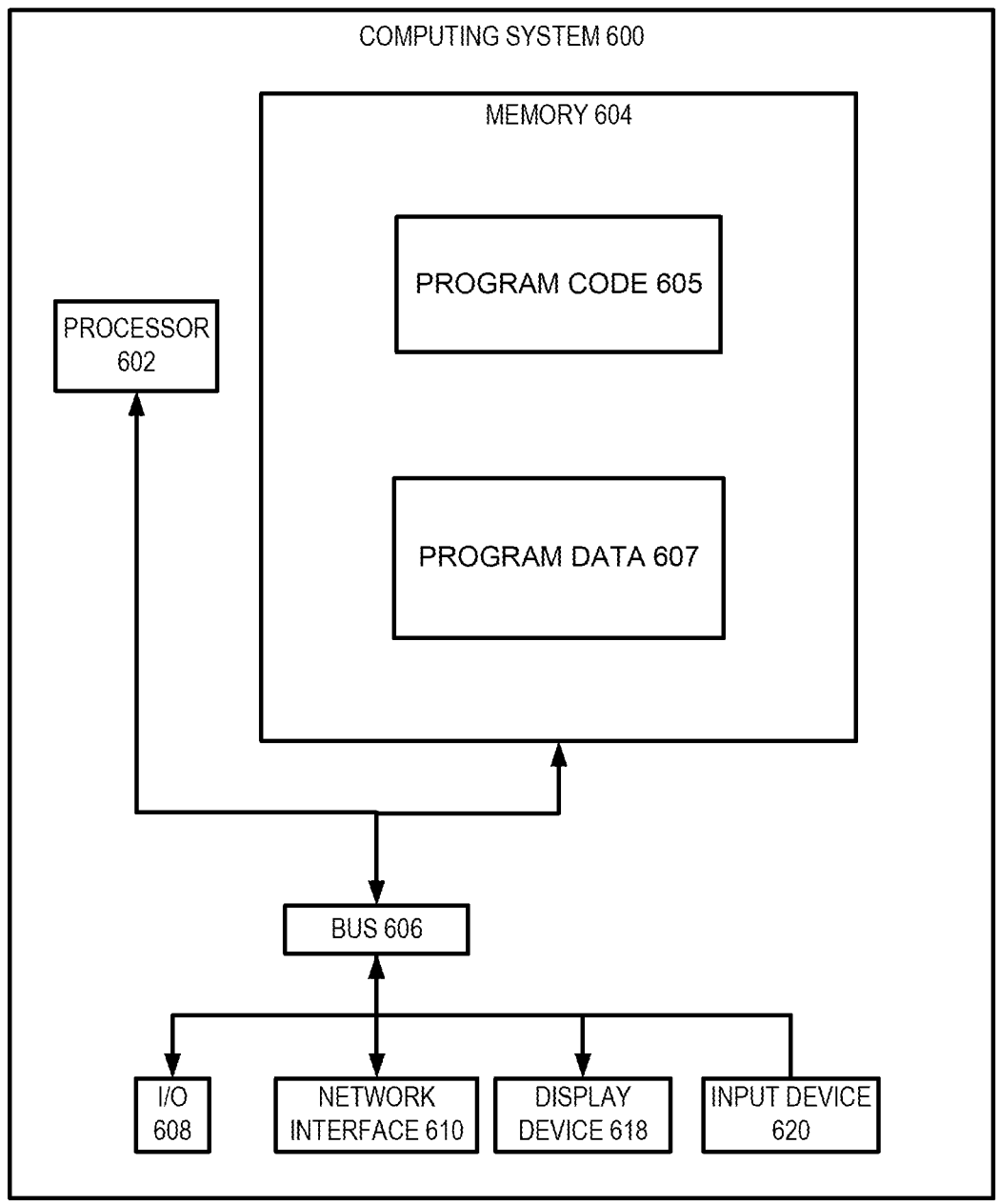
FIG. 6 depicts an example of a computing system for implementing certain embodiments of the present disclosure.

Any suitable computing system or group of computing systems can be used for performing the operations described herein. For example, FIG. 6 depicts an example of the computing system 600. The implementation of computing system 600 could be used for one or more of a content placement system 102 and a host system 112. In other embodiments, a single computing system 600 having devices similar to those depicted in FIG. 6 (e.g., a processor, a memory, etc.) combines the one or more operations and data stores depicted as separate systems in FIG. 1.

The depicted example of a computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

A memory device 604 includes any suitable non-transitory computer-readable medium for storing program code 605, program data 607, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 executes program code 605 that configures the processor 602 to perform one or more of the operations described herein. Examples of the program code 605 include, in various embodiments, the content selection portal 104 and the dynamic content placement engine 110 by the content placement system 102, the online platform 114 or other suitable applications that perform one or more operations described herein (e.g., one or more development applications for configuring the online platforms 114). The program code may be resident in the memory device 604 or any suitable computer-readable medium and may be executed by the processor 602 or any other suitable processor.

In some embodiments, one or more memory devices 604 stores program data 607 that includes one or more datasets and models described herein. Examples of these datasets include interaction data, user data, etc. In some embodiments, one or more of data sets, models, and functions are stored in the same memory device (e.g., one of the memory devices 604). In additional or alternative embodiments, one or more of the programs, data sets, models, and functions described herein are stored in different memory devices 604 accessible via a data network. One or more buses 606 are also included in the computing system 600. The buses 606 communicatively couples one or more components of a respective one of the computing system 600.

In some embodiments, the computing system 600 also includes a network interface device 610. The network interface device 610 includes any device or group of devices suitable for establishing a wired or wireless data connection to one or more data networks. Non-limiting examples of the network interface device 610 include an Ethernet network adapter, a modem, and/or the like. The computing system 600 is able to communicate with one or more other computing devices (e.g., a computing device executing a content placement system 102) via a data network using the network interface device 610.

The computing system 600 may also include a number of external or internal devices, an input device 620, a presentation device 618, or other input or output devices. For example, the computing system 600 is shown with one or more input/output ("I/O") interfaces 608. An I/O interface 608 can receive input from input devices or provide output to output devices. An input device 620 can include any device or group of devices suitable for receiving visual, auditory, or other suitable input that controls or affects the operations of the processor 602. Non-limiting examples of the input device 620 include a touchscreen, a mouse, a keyboard, a microphone, a separate mobile computing device, etc. A presentation device 618 can include any device or group of devices suitable for providing visual, auditory, or other suitable sensory output. Non-limiting examples of the presentation device 618 include a touchscreen, a monitor, a speaker, a separate mobile computing device, etc.

Although FIG. 6 depicts the input device 620 and the presentation device 618 as being local to the computing device that executes the content placement system 102, other implementations are possible. For instance, in some embodiments, one or more of the input device 620 and the presentation device 618 can include a remote client-computing device that communicates with the computing system 600 via the network interface device 610 using one or more data networks described herein.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method, comprising:
   receiving, by one or more processing devices, a request for content objects to be presented in a user interface;
   determining, by the one or more processing devices, a layout for dividing a display region for displaying the content objects into a plurality of virtual locations, each of the plurality of virtual locations is associated with a location priority, wherein the location priorities respectively associated with the plurality of virtual locations are determined based on respective frequencies of interaction by a plurality of users with the plurality of virtual locations in the user interface;

determining, by the one or more processing devices, content objects for the plurality of virtual locations based on content priorities associated with the content objects;

determining an order for the plurality of virtual locations according to the location priorities of the plurality of the virtual locations;

determining, by the one or more processing devices, an allocation of the content objects to the plurality of virtual locations according to the order determined based on the location priorities of the plurality of the virtual locations; and transmitting, by one or more processing devices and to an online platform, a control message identifying the content objects and the allocation, wherein transmitting the control message to the online platform causes the content objects to be presented in the display region of the user interface according to the allocation.

2. The method of claim 1, wherein determining the allocation of the content objects to the virtual locations comprises:

determining a particular virtual location among the plurality of virtual locations that has a highest location priority; and assigning a set of content objects to the particular virtual location.

3. The method of claim 2, wherein determining the allocation of the content objects to the virtual locations further comprises:

determining an additional virtual location among remaining virtual locations of the plurality of virtual locations that has a highest location priority;

adding one or more unassigned content objects from the set of content objects to an additional set of content objects for the additional virtual location;

removing, from the additional set of content objects for the additional virtual location, a content object that has been assigned to the particular virtual location; and assigning the additional set of content objects to the additional virtual location.

4. The method of claim 1, wherein a content priority of a content object is determined based on relationship between the content object and historical behaviors associated with a user to whom the user interface is to be presented and wherein the historical behaviors associated with the user comprise past transactions performed by the user.

5. The method of claim 1, wherein the display region contains blocks;

each of the plurality of virtual locations contains one or more spots each configured for displaying a content object; and each of the one or more spots occupies one or more of the blocks, wherein determining an allocation of the content objects to each of the plurality of virtual locations comprises determining an allocation of the content objects to the one or more spots in each of the plurality of virtual locations.

6. The method of claim 5, further comprising converting the allocation of the content objects to an ordered list of content objects, wherein the ordered list of content objects are presented in the blocks in the user interface according to an order of the content objects in the ordered list.

7. The method of claim 1, wherein a first virtual location has a higher location priority than a second virtual location based on historical interaction data indicating more frequent user interaction with the first virtual location than the second virtual location.

8. A computing system comprising:

a processing device; and a non-transitory computer-readable medium communicatively coupled to the processing device, wherein the processing device is configured to execute program code stored in the non-transitory computer-readable medium and thereby perform operations comprising:

determining a layout for dividing a display region of a user interface for displaying content objects into a plurality of virtual locations, wherein each of the plurality of virtual locations is associated with a location priority, wherein the location priorities respectively associated with the plurality of virtual locations are determined based on respective frequencies of interaction by a plurality of users with the plurality of virtual locations in the user interface, determining content objects for the plurality of virtual locations, determining an order for the plurality of virtual locations according to the location priorities of the plurality of the virtual locations, determining an allocation of the content objects to the plurality of virtual locations according to the order determined based on the location priorities of the plurality of the virtual locations, and transmitting a control message to an online platform, wherein the control message identifies the content objects and the allocation, and transmitting the control message to the online platform causes the content objects to be presented in the display region of the user interface according to the allocation.

9. The computing system of claim 8, wherein determining the allocation of the content objects to the virtual locations comprises:

determining a particular virtual location among the plurality of virtual locations that has a highest location priority; and assigning a set of content objects to the particular virtual location.

10. The computing system of claim 9, wherein determining the allocation of the content objects to the virtual locations further comprises:

determining an additional virtual location among remaining virtual locations of the plurality of virtual locations that has a highest location priority;

adding one or more unassigned content objects from the set of content objects to an additional set of content objects for the additional virtual location;

removing, from the additional set of content objects for the additional virtual location, a content object that has been assigned to the particular virtual location; and assigning the additional set of content objects to the additional virtual location.

11. The computing system of claim 8, wherein the display region contains blocks;

each of the plurality of virtual locations contains one or more spots each configured for displaying a content object; and each of the one or more spots occupies one or more of the blocks, wherein determining an allocation of the content objects to each of the plurality of virtual locations comprises determining an allocation of the content objects to the one or more spots in each of the plurality of virtual locations.

12. The computing system of claim 8, wherein a first virtual location has a higher location priority than a second virtual location based on historical interaction data indicating more frequent user interaction with the first virtual location than the second virtual location.

13. The computing system of claim 8, wherein the content objects for each of the plurality of virtual locations are determined based on content priorities associated with the content objects.

14. The computing system of claim 13, wherein a content priority of a content object is determined based on relationship between the content object and historical behaviors associated with a user to whom the user interface is to be presented and wherein the historical behaviors associated with the user comprise past transactions performed by the user.

15. A non-transitory computer-readable medium having program code that is stored thereon, the program code executable by one or more processing devices for performing operations comprising:
    determining a layout for dividing a display region of a user interface configured for displaying content objects into a plurality of virtual locations, each of the plurality of virtual locations is associated with a location priority, wherein the location priorities respectively associated with the plurality of virtual locations are determined based on respective frequencies of interaction by a plurality of users with the plurality of virtual locations in the user interface;
    determining content objects for the plurality of virtual locations;
    determining an order for the plurality of virtual locations according to the location priorities of the plurality of the virtual locations;
    determining an allocation of the content objects to the plurality of virtual locations according to the order determined based on the location priorities of the plurality of the virtual locations; and
    transmitting, to an online platform, a control message identifying the content objects and the allocation, wherein transmitting the control message to the online platform causes the content objects to be presented in the display region of the user interface according to the allocation.

16. The non-transitory computer-readable medium of claim 15, wherein determining the allocation of the content objects to the virtual locations comprises:
    determining a particular virtual location among the plurality of virtual locations that has a highest location priority; and
    assigning a set of content objects to the particular virtual location.

17. The non-transitory computer-readable medium of claim 16, wherein determining the allocation of the content objects to the virtual locations further comprises:
    determining an additional virtual location among remaining virtual locations of the plurality of virtual locations that has a highest location priority;
    adding one or more unassigned content objects from the set of content objects to an additional set of content objects for the additional virtual location;
    removing, from the additional set of content objects for the additional virtual location, a content object that has been assigned to the particular virtual location; and
    assigning the additional set of content objects to the additional virtual location.

18. The non-transitory computer-readable medium of claim 15, wherein
    the display region contains blocks;
    each of the plurality of virtual locations contains one or more spots each configured for displaying a content object; and
    each of the one or more spots occupies one or more of the blocks, wherein determining an allocation of the content objects to each of the plurality of virtual locations comprises determining an allocation of the content objects to the one or more spots in each of the plurality of virtual locations.

19. The non-transitory computer-readable medium of claim 15, wherein a first virtual location has a higher location priority than a second virtual location based on historical interaction data indicating more frequent user interaction with the first virtual location than the second virtual location.

20. The non-transitory computer-readable medium of claim 15, wherein the content objects for each of the plurality of virtual locations are determined based on content priorities associated with the content objects.

* * * * *